United States Patent [19]

Mutton

[11] 4,250,378
[45] Feb. 10, 1981

[54] PHOTOELECTRIC JOYSTICK
[75] Inventor: Jon C. Mutton, Portland, Oreg.
[73] Assignee: Tektronix, Inc., Beaverton, Oreg.
[21] Appl. No.: 949,180
[22] Filed: Oct. 6, 1978
[51] Int. Cl.³ .............................................. G01V 9/04
[52] U.S. Cl. ................................. 250/221; 250/211 K
[58] Field of Search ........... 250/221, 222, 229, 211 K; 340/36 SP

[56] References Cited
U.S. PATENT DOCUMENTS

| | | | |
|---|---|---|---|
| 3,478,220 | 11/1969 | Milroy | 250/221 |
| 3,764,813 | 10/1973 | Clement et al. | 250/221 |
| 3,787,837 | 1/1974 | Allen et al. | 250/229 |
| 3,811,047 | 5/1974 | Shragal | 250/211 K |
| 3,856,127 | 12/1974 | Halfon et al. | 250/221 |
| 4,092,532 | 5/1978 | Hayes | 250/221 |

Primary Examiner—David C. Nelms
Attorney, Agent, or Firm—Thomas J. Spence

[57] ABSTRACT

A device and method for producing a digital signal representative of the position of a moveable control stick relative to one or more reference planes. The device includes means for detecting the location of a shadow cast by a portion of the control stick extending between one or more light-emitting elements and one or more light-sensitive elements, and means for generating a digital signal representative of the detected location. With the light-emitting or light-sensitive elements oriented in a planar array, the signal thus generated is representative of the position of the control stick relative to the plane of the array.

10 Claims, 9 Drawing Figures

PHOTOELECTRIC JOYSTICK

BACKGROUND OF THE INVENTION

The subject matter of the present invention pertains to means for indicating the relative position of a joystick-type control stick commonly employed to control the operation of various kinds of electronic equipment.

Normally, such devices comprise a pivotably mounted control stick that is mechanically coupled to one or more variable electronic circuit elements such as variable resistors or potentiometers. Pivotal movement of the stick about a fulcrum produces a corresponding change in the value of the circuit elements, with the changing value being employed usually to produce electronic analog signals that are representative of the stick's position of the stick relative to one or more planes of reference.

The disadvantages of such devices are that the output signals initially produced are of an analog rather than digital nature and must therefore undergo a subsequent conversion before being useful in a digital environment, the output signals are often subject to contamination with noise signals generated by the movement of mechanical contacts within the variable circuit elements, and the variable elements are subject to mechanical and electrical deterioration brought on by wear and aging. Moreover, free movement of the control stick, a very desirable feature with this type of device, is often hindered by inertia and frictional forces acting among the various mechanical components.

A contactless positional encoder such as that disclosed by Wester U.S. Pat. No. 3,886,361 overcomes some of the above-mentioned disadvantages; however, the output signal produced is still of an analog rather than digital nature. Accordingly, a need still exists for a non-mechanical control stick device capable of producing directly a digital signal that is representative of the relative position of the stick.

SUMMARY OF THE INVENTION

The present invention is directed to a contact-free, joystick-type position encoder capable of producing directly a digital output signal representative of the relative position of the stick. More particularly, the encoder comprises a pivotably mounted control stick having a portion that is positionable between one or more light-emitting elements and one or more light-sensitive elements so as to selectively shade at least one light-sensitive element from at least one light-emitting element, and electronic circuit means for producing a digital signal indicative of the particular light-emitter/light-sensor pair being affected, such signal being representative of the position of the control stick relative to such element pair.

In one exemplary embodiment, a single light-emitting element is employed in association with a single spaced array of light-sensitive elements and the digital signal produced is indicative of a particular light-sensitive element being shaded by the control stick. In a second exemplary embodiment, a single light-sensitive element is employed with a single spaced array of light-emitting elements and the digital signal produced is indicative of a particular light-emitting element being hidden by the control stick from view by the light-sensitive element. In either case, the digital signal produced by the associated electronic circuitry is representative of the position of the control stick relative to the respective array of light-sensitive or light-emitting elements.

A third embodiment is also disclosed wherein two arrays of light-sensitive elements are mounted on a single planar supportive substrate and employed with a single light-emitting element and appropriate electronic circuitry to provide a digital representation of the position of the component control stick relative to two mutually non-parallel reference planes. Also disclosed is a method of producing such a representation utilizing the concept of such a device.

A particular advantage of the position encoder of the present invention is that its output signal is inherently digital and therefore usable directly without conversion by digitally oriented electronic equipment. In addition, the device is of simple construction, containing no moving parts other than the control stick itself, and requires no mechanical coupling between its component parts. It needs no calibration beyond its initial assembly and is not subject to significant wear or aging.

It is, therefore, a principle objective of the present invention to provide a contact-free joystick-type optical position encoder and method capable of producing directly a digital signal representative of the relative position of its component control stick.

It is an additional objective of the present invention to provide an optical joystick-type position encoder wherein a single light-emitting element and a spaced array of light-sensitive elements are utilized to determine the relative position of a component control stick.

It is a further objective of the present invention to provide an optical joystick-type position encoder wherein a single light-sensitive element is employed with a spaced array of light-emitting elements to determine the relative position of a component control stick.

It is a still further objective of the present invention, to provide an optical joystick-type position encoder of the type disclosed wherein a plurality of spaced arrays of light-sensitive or light-emitting elements are mounted on a single planar substrate and employed to determine the position of a component control stick relative to a like plurality of mutually non-parallel reference planes.

The foregoing objectives, features and advantages of the present invention will be more readily understood upon consideration of the following detailed description of the invention taken in conjunction with the accompanying drawings.

DESCRIPTION OF EXEMPLARY EMBODIMENTS

Figures 1, 1A, 2:
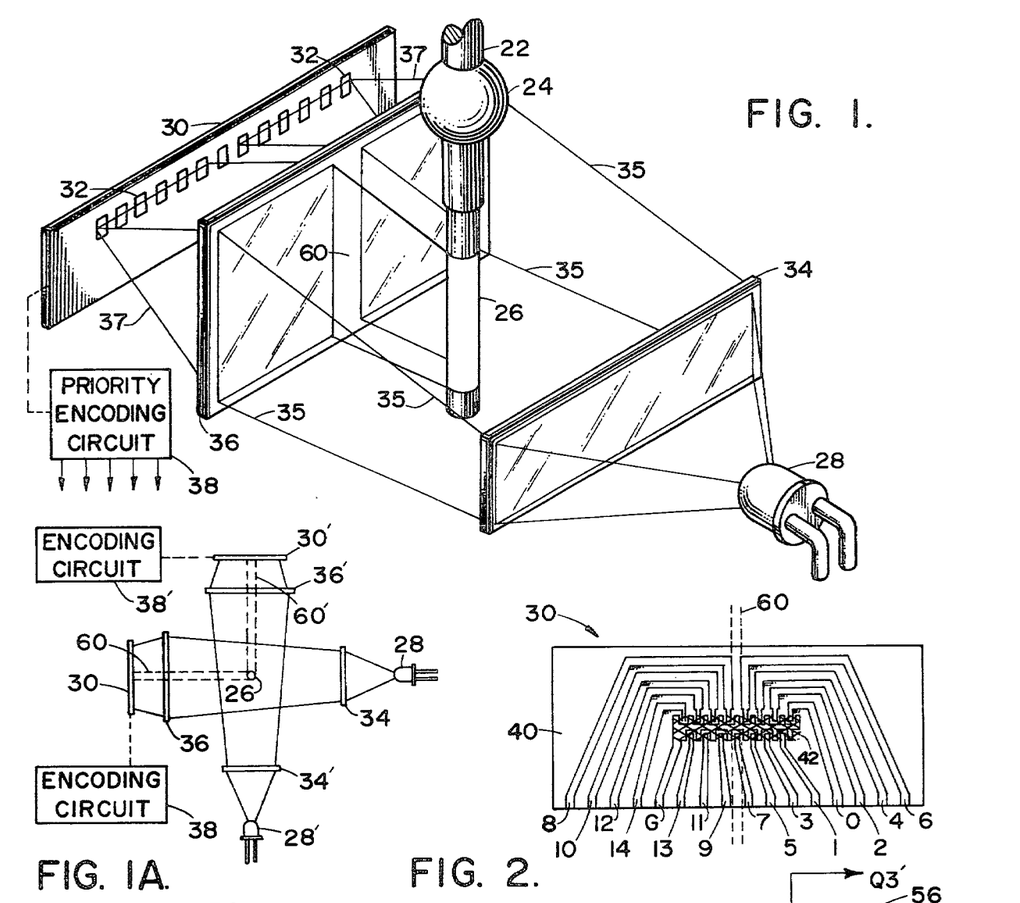
FIG. 1 is a perspective view of a first exemplary embodiment of the optical encoder device of the present invention.
FIG. 1A is a plan view of a modification of the encoder embodiment shown in FIG. 1.
FIG. 2 is an enlarged view of an array of light-sensitive elements forming a part of the optical encoder of FIG. 1.
Figure 3:
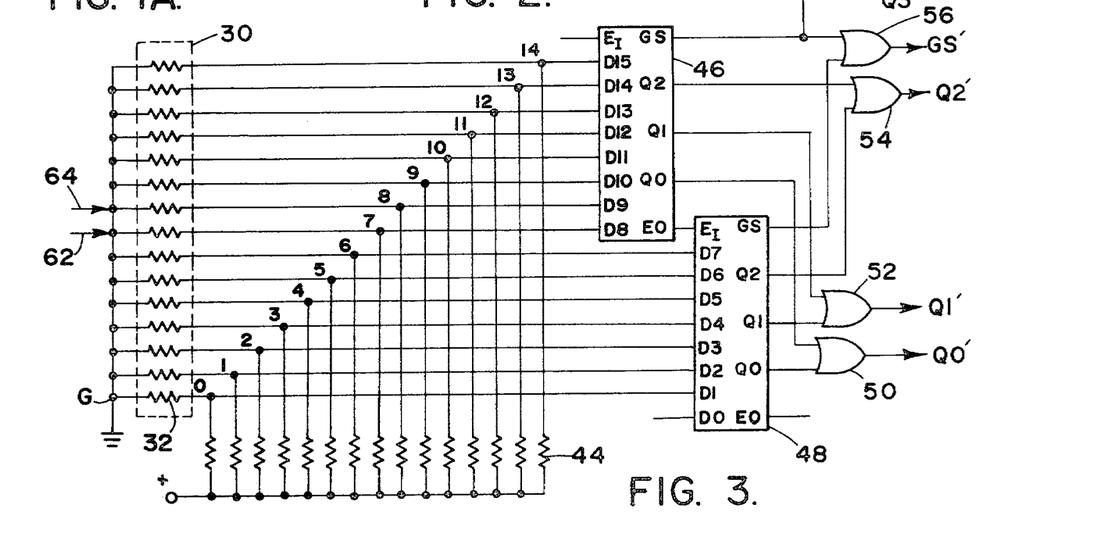
FIG. 3 is a simplified logic-level diagram of a digital encoder circuit forming a part of the optical encoder of FIG. 1.

Referring first to FIGS. 1-3 of the drawings, there is shown a first exemplary embodiment of the optical position encoder of the present invention comprising a single light source 28, a spaced array 30 of light-sensitive elements 32, a control stick 22 pivotably coupled at a spherical fulcrum portion 24 to a supporting member (omitted from the drawings for clarity) such that an elongate portion 26 extends between the light source 28 and the spaced array 30 of light-sensitive elements 32, and a priority encoding circuit 38 electrically connected to each of the light-sensitive elements 32 for producing a digital signal as described hereinbelow. A first lens element 34 and a second lens element 36 may also be employed as shown in FIG. 1 to focus the light rays emanating from the light source 28 as indicated by the lines 35 and 37 respectively. As used herein, the term "light" is understood to include electro-magnetic radiation in the wavelength range including infrared, visable, and ultraviolet rays. The array 30 of light-sensitive elements 32, shown somewhat simplified in FIG. 1, is shown more clearly in FIG. 2, and the electrical representation of the array, together with the logic circuitry of the encoding circuit 38, is shown in the logic diagram of FIG. 3.

As depicted in FIG. 2, the array 30 of light-sensitive elements 32 is of thick film construction mounted on a supportive substrate member 40 of any suitable electrically nonconductive material such as the polycrystalline ceramics, aluminum oxide or beryllium oxide. Its component parts include a common conductor G and an associated plurality of individual conductors 0-14, each of which may be formed from any of the commonly used conductor pastes known to those familiar with the thick film art, and an overlying layer 42 (shown as a cross-hatched area) of a suitable screenable photoconductive paste such as cadmium sulfide. In the absence of light, cadmium sulfide provides few free electrons and functions as a high-resistance insulator, while in the presence of light, electrons in the material are excited by the energy of the radiation and the material becomes a low-resistance conductor. As such, the material serves in the present invention to form a light-sensitive connection between each of the conductors 0-14 and the common conductor G. Other screenable photoconductive pastes having similar characteristics may also be used. Each of the photoconductive paths thus formed between the conductors 0-14 and the common conductor G by the photoconductive layer 42 defines a single light-sensitive element 32.

In use, the array 30 of light-sensitive elements 32 (shown as resistors in FIG. 3) is connected as indicated in the figure to a like plurality of resistive elements 44, a pair of identical priority encoder modules 46 and 48, and a plurality of logical OR-gates 50-56. Each resistive element 44 is selected to have a fixed resistance substantially equal to that of its associated light-sensitive element 32 when the latter element is subjected to a preselected level of illumination. A suitable priority encoder module for us in the pair 46, 48 is the COS/MOS 8-bit priority encoder manufactured by the Radio Corporation of America (RCA) under the designation CD4532B. As defined by RCA, and with reference to the terminals of module 48 as labled in FIG. 3:

The RCA-CD4532B consists of combinational logic that encodes the highest priority input (D7-D0) to a 3-bit binary code. The eight inputs, D7 through D0, each have an assigned priority; D7 is the highest priority and D0 is the lowest. The priority encoder is inhibited when the chip-enable input $E_I$ is low. When $E_I$ is high, the binary representation of the highest-priority input appears on output line Q2-Q0, and the group select line GS is high to indicate that priority inputs are present. The enable-out ($E_O$) is high when no priority inputs are present. If any one input is high, $E_O$ is low and all cascaded lower-order stages are disabled.

Other encoder circuits having similar characteristics may also be used. The truth table for a single encoder module, for example module 48, is shown below in Table I and a partial truth table for the two modules 46 and 48 connected as shown in FIG. 3 to the four OR-gates 52-56 is shown below in Table II.

TABLE I

| TRUTH TABLE | | | | | | | | | | | | | |
|---|---|---|---|---|---|---|---|---|---|---|---|---|---|
| Input | | | | | | | | | Output | | | | |
| $E_I$ | D7 | D6 | D5 | D4 | D3 | D2 | D1 | D0 | GS | Q2 | Q1 | Q0 | $E_O$ |
| 0 | X | X | X | X | X | X | X | X | 0 | 0 | 0 | 0 | 0 |
| 1 | 0 | 0 | 0 | 0 | 0 | 0 | 0 | 0 | 0 | 0 | 0 | 0 | 1 |
| 1 | 1 | X | X | X | X | X | X | X | 1 | 1 | 1 | 1 | 0 |
| 1 | 0 | 1 | X | X | X | X | X | X | 1 | 1 | 1 | 0 | 0 |
| 1 | 0 | 0 | 1 | X | X | X | X | X | 1 | 1 | 0 | 1 | 0 |
| 1 | 0 | 0 | 0 | 1 | X | X | X | X | 1 | 1 | 0 | 0 | 0 |
| 1 | 0 | 0 | 0 | 0 | 1 | X | X | X | 1 | 0 | 1 | 1 | 0 |
| 1 | 0 | 0 | 0 | 0 | 0 | 1 | X | X | 1 | 0 | 1 | 0 | 0 |
| 1 | 0 | 0 | 0 | 0 | 0 | 0 | 1 | X | 1 | 0 | 0 | 1 | 0 |
| 1 | 0 | 0 | 0 | 0 | 0 | 0 | 0 | 1 | 1 | 0 | 0 | 0 | 0 |

X = Don't Care
Logic 1 = High
Logic 0 = Low

TABLE II

| TRUTH TABLE | | | | | | | | | | | | | | |
|---|---|---|---|---|---|---|---|---|---|---|---|---|---|---|
| Input | | | | | | | | | | | Output | | | |
| D9 | D8 | D7 | D6 | D5 | D4 | D3 | D2 | D1 | D0 | GS | Q3 | Q2 | Q1 | Q0 |
| 1 | x | X | X | X | X | X | X | X | X | 0 | 1 | 0 | 0 | 0 |
| 0 | 1 | X | X | X | X | X | X | X | X | 0 | 1 | 0 | 0 | 0 |
| 0 | 0 | 1 | X | X | X | X | X | X | X | 1 | 0 | 1 | 1 | 1 |
| 0 | 0 | 0 | 1 | X | X | X | X | X | X | 1 | 0 | 1 | 1 | 0 |
| 0 | 0 | 0 | 0 | 1 | X | X | X | X | X | 1 | 0 | 1 | 0 | 1 |
| 0 | 0 | 0 | 0 | 0 | 1 | X | X | X | X | 1 | 0 | 1 | 0 | 0 |
| 0 | 0 | 0 | 0 | 0 | 0 | 1 | X | X | X | 1 | 0 | 0 | 1 | 1 |
| 0 | 0 | 0 | 0 | 0 | 0 | 0 | 1 | X | X | 1 | 0 | 0 | 1 | 0 |
| 0 | 0 | 0 | 0 | 0 | 0 | 0 | 0 | 1 | X | 1 | 0 | 0 | 0 | 1 |
| 0 | 0 | 0 | 0 | 0 | 0 | 0 | 0 | 0 | 1 | 1 | 0 | 0 | 0 | 0 |

X = Don't Care
Logic 1 = High
Logic 0 = Low

In operation, light waves emanating from the light source 28 are collimated by the first lens element 34, preferably a Fresnel-type converging lens having a real focal point or line located at the light source, and caused to pass beyond the elongate portion 26 of the control stick 22 for refocusing over the array 30 of light-sensitive elements 32 by the second lens element 36, also preferably of cylindrical Fresnel-type converging design. Ignoring for the moment the shadow 60 cast by the elongate portion 26 of the control stick 22 extending into the path of the collimated lightwaves, the illumination of the light-sensitive array 30 by the light source 28 will cause the photoconductive material 42 of the array to become a low-resistance conductor and provide a conductive path between each of the conductors 0–14 and the common conductor G. With the conductor G connected to ground and the resistive elements 44 connected to a positive voltage supply (+), as indicated in FIG. 3, the illumination of the photoconductive material 42 will cause a relatively low voltage to be developed across each of the light-sensitive elements 32. This voltage, defined herein as a logical 0, is detectable at each of the points labeled 0–14, in FIG. 3, such points corresponding to the conductors 0–14 in FIG. 2.

Considering now the shadow 60 cast by the elongate portion 26 of the control stick 22, it is seen that the effect of the shadow is to shade at least one of the light-sensitive elements 32 from the lightwaves emanating from the light source 28. The particular light-sensitive element 32 thus shaded will be converted from a low-resistance conductor to a high-resistance insulator, thereby causing a relatively high voltage to be developed between its respective conductor 0–14 and the common conductor G. This second voltage, defined herein as a logical 1, will also be developed at one of the input terminals of the encoder modules 46 and 48. For example, with the shadow 60 positioned as indicated in FIGS. 1 and 2, the particular light-sensitive element 32 indicated by the arrow 62 of FIG. 3 will be shaded and a relatively high voltage will be developed between conductor 7 and conductor G, and simultaneously impressed upon input terminal D8 of priority encoder module 46. As seen from the truth table of Table II, the logical 1 of priority signal impressed upon terminal D8 of module 46, with the other terminals receiving logical 0's will cause a digital signal 1000 to be produced at output terminals Q3', Q2', Q1', and Q0', respectively, of the combined circuit. Treating the logical 1 produced at output Q3' to be an indication of positive sense, the output signal produced by the encoding circuit 38 represents a positive zero and indicates, for example, that the control stick is centered with respect to the array 30 of elements 32.

If the control stick 22 is next moved such that the shadow 60 is cast, for example, over the particular light-sensitive element 32 identified by the arrow 64 in FIG. 3, the output of the encoding circuit 38, according to the truth table of Table II, will be 1001, or a positive one, indicating that the control stick 22 has been moved one division from its earlier, centered position. In a similar manner, movement of the control stick in the opposite direction will cause a digital signal to be produced representative of its displacement in that direction.

The use of the priority encoding scheme in the circuit 38 of FIG. 3 ensures that only one digital output signal will be produced at the terminals Q0'–Q3' even if more than one light-sensitive element 32 is shaded by the control stick 22. This is because a logical 1 at any of the input terminals D0–D15 of the combined encoder modules 46, 48 will take precedence or have priority over any signal present at a lesser terminal. For example, referring to the truth table of Table II, a logical 1 at input terminal D5 will have priority over signals at terminals D0–D4. Only the highest priority signal present at the input of the combined encoder modules 46 and 48 will produce an output signal. The result is that the output signal produced at the output terminals Q0'–Q3' of circuit 38 is indicative of only the right or left leading edge of the control stick 22, depending on the orientation of the array 30 to the circuit 38. Thus, the accuracy of the device is dependent only on the number and size of the elements 32 in the array 30 and not on the width of the stick 22.

Accordingly, it is seen that the optical encoding device of the present invention as so far disclosed is capable of producing a continuous digital signal at its output terminals representative of the position of the control stick 22 relative to a plane containing the array 30 of photoconductive or light-sensitive elements 32. It should be noted, that the output signals produced by the two encoder modules 46 and 48 may be combined by any suitable conventional logic circuitry to produce a resultant output signal in any desired code such as, for example, binary coded decimal (BCD), straight binary, or gray, and that the OR-gates 50–56 of FIG. 3 demonstrate only one such logical combination.

As indicated in FIG. 1A, two sets of light sources 28 and 28', light-sensitive arrays 30 and 30', and associated encoding circuits 38 and 38' may be combined with a single control stick 22 to create a device capable of producing digital signals representative of the position of the control stick relative to the two planes containing, respectively, the two arrays 30 and 30'. Lens elements 34, 34', 36, and 36' may also be employed as before to focus the lightwaves emanating from their respective light sources 28 and 28'.

Figure 4:
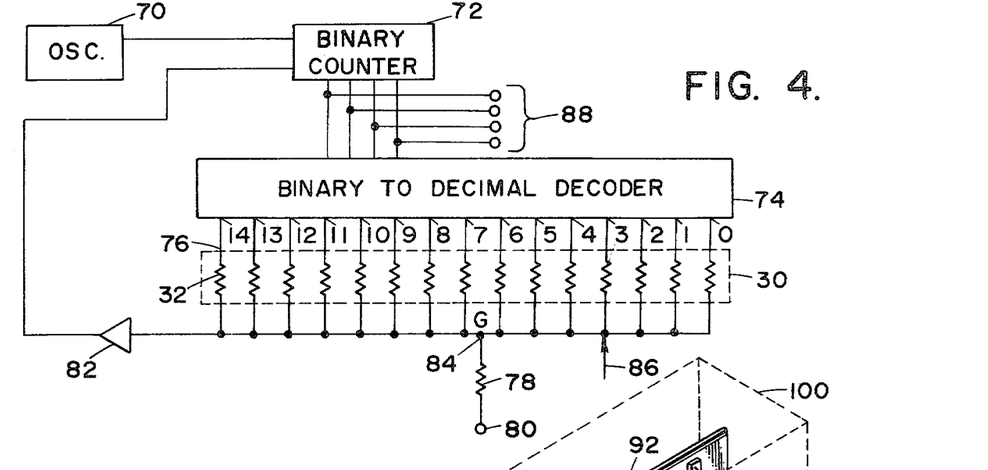
FIG. 4 is a simplified logic-level diagram of a digital encoder circuit alternately forming a part of the optical encoder of FIG. 1.

Referring now to FIG. 4, there is shown a logic diagram of an alternate embodiment of the encoding circuit 38. In this embodiment, a free-running oscillator 70 is employed to drive a digital counter 72 which in turn controls the operation of a binary-to-decimal decoder 74 having a plurality of open-collector terminals 76 that are connected to the conductors 0–14 of the array 30 of light-sensitive elements 32 described earlier. The light-sensitive elements 32 are also connected via common conductor G through a single resistive element 78 to a voltage source 80 and through a sense amplifier 82 back to the binary counter 72. As will be apparent to those persons familiar with the art, and considering each terminal 76 individually, whenever a particular open-collector terminal 76 of the decoder 74 is caused to go low, that is become conductive, the connecting point 84 between the respective light-sensitive element 32 and the fixed resistor 78 will also be low with respect to the potential at the voltage source 80 if the light-sensitive element 32 is illuminated, but will remain high, also with respect to the voltage source 80, if the light-sensitive element is in shadow.

In operation, with one of the light-sensitive elements 32 of FIG. 4, for example that indicated by the arrow 86, shaded as before by the elongate portion 26 of the control stick 22, the binary counter 72 will be caused by the oscillator 70 to sequentially cause each of the open-collector output terminals 76 of the binary to decimal decoder 74 to go low. As each terminal 76 associated with an illuminated element 32 goes low, the connecting point 84 will also go low, causing the output signal from the sense amplifier 82 to be low. As long as the output signal from the sense amplifier 82 is low, the binary counter will remain enabled and continue to sequentially activate the decoder terminals 76. Once the decoder terminal 76 associated with the shaded element 32 indicated by the arrow 86 is caused to go low, the higher resistance of the shaded element will cause the connecting point 84 to go high, causing in turn the output signal from the sense amplifier 82 to go high. Upon receiving the high-level signal from the amplifier 82, the binary counter 72 will be disabled and the binary signal present at its output terminals 88 (the same signal used to control the decoder 74) will be representative of the particular element 32 shaded by the control stick 22, and therefore also representative of the position of the stick relative to the plane containing the array 30 of such elements. Conventional circuitry (omitted from the figures for clarity) may be employed to receive periodically the signal from the terminals 88 and restart the counter 72 for cyclical operation of the entire circuit.

It will again be recognized by those persons familiar with the art that any desired coding scheme may be employed to successively activate the light-sensitive elements 32 in the array 30 and that the output signal present at the terminals 88 upon cessation of counting by the counter 72 may be converted to any desired form, the only requirement being that the output signal remain a unique digital representation of the particular element 32 being shaded and thus a unique representation of the position of the control stick relative to the array 30. If the light-sensitive elements 32 are activated in sequential order from one end of the array 30 to the other, the output signal of the counter 72 will indicate the position of only the leading edge of the control stick 22 and again be independent of the stick width.

It will also be recognized that light-sensitive elements other than the photoconductive elements described above may be employed in a manner analogous to that indicated without departing from the invention as disclosed. The light source 28 may also be any suitable device such as, for example, an incandescent lamp or a light-emitting diode.

Figure 5:
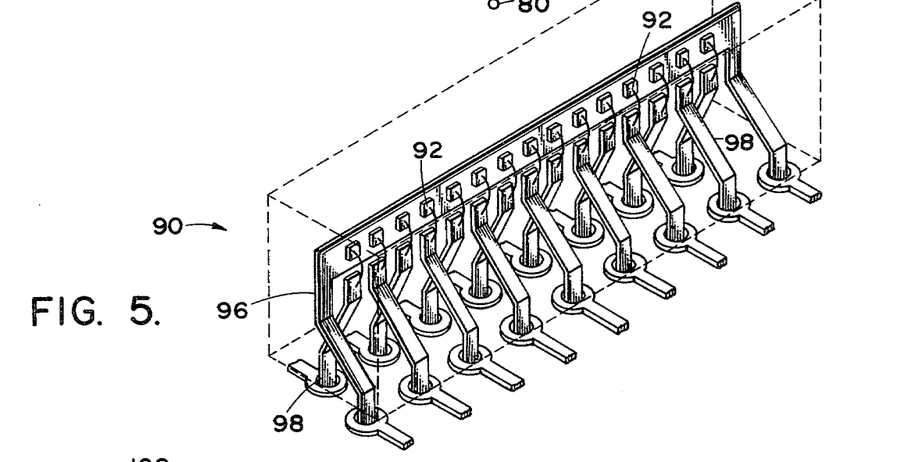
FIG. 5 is a partially phantomed perspective view of an array of light-emitting elements forming a part of a second exemplary embodiment of the optical encoder device of the present invention.
Figure 6:
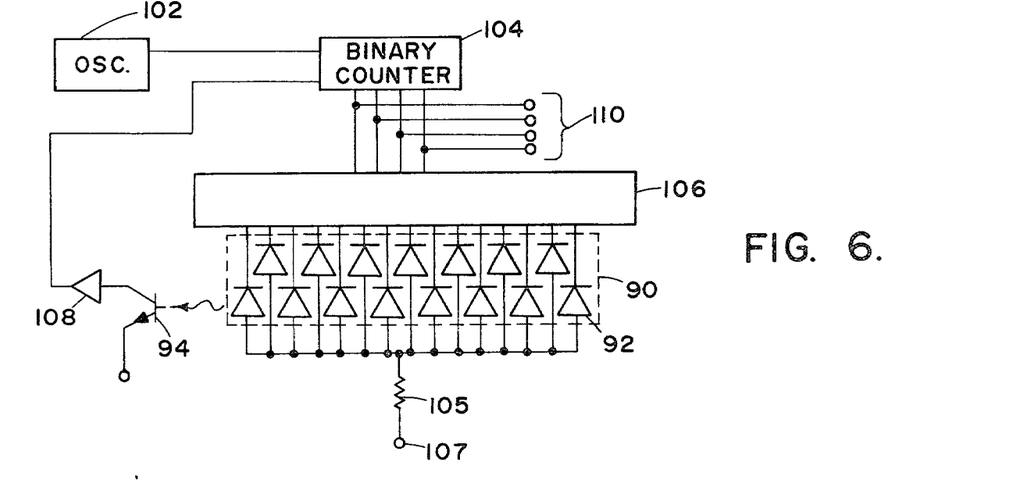
FIG. 6 is a simplified logic-level diagram of a digital encoding circuit employed with the array of light-emitting elements shown in FIG. 5.

A second exemplary embodiment of the optical position encoder of the present invention is shown in FIGS. 5 and 6 with reference to FIG. 1. In this second embodiment, the array 30 of light-sensitive elements 32 and the light source 28 shown in FIG. 1 are replaced, respectively, by the array 90 of light-emitting elements 92 a single photosensitive element 94 shown in FIG. 5 and 6. The light-emitting elements 92 may be, for example, light-emitting diodes and the photosensitive element 94 may be, similarly for example, a phototransistor or photodiode. Other light-emitting and light-sensitive elements may also be employed without departing from the invention as disclosed. The light-emitting elements 92 of FIG. 5 are mounted on a common electrically conductive support member 96 and individually connected electrically to a respective conductor 98. As shown in the figure, the emitter array 90 may also be encased in a suitable light-transparent material 100 and configured for readily removeable connection to a conventional circuit board. Other suitable mounting means may also be employed.

As shown in FIG. 6, the array 90 of light-emitting elements 92 (indicated as light-emitting diodes) and the single light-sensitive element 94 (indicated as a phototransistor) are electrically connected to form a part of a circuit also including a free-running oscillator 102, a binary counter 104, a sequentially activatable circuit 106 for selectively energizing the light-emitter elements 92 in response to a binary code presented to the circuit by the counter 104, a resistive element 105 connecting the array 90 to a voltage source 107, and a sense amplifier 108 for transmitting signals from the light-sensitive element 94 back to the counter.

In operation, keeping in mind the configuration of FIG. 1 and the element replacements mentioned above, and with the elongate portion 26 of the control stick 22 shading the light-sensitive element 94 from at least one of the light-emitting elements 92, the counter 104 is caused by the oscillator 102 to energize sequentially each light-emitting element 92 in a predefined order. As each element 92 is energized, its light output will be sensed by the single light-sensitive element 94, causing the latter element to produce a signal which is transmitted by the sense amplifier 108 back to the counter 104. The signal from the light-sensitive element 94 may be either high or low depending upon the manner in which the particular element is connected to other conventional circuit elements omitted from the drawing for clarity. As long as this signal from the sense amplifier is present, the counter will be enabled and continue to count. When, however, the particular light-emitting element 92 from which the light-sensitive element 94 is shaded by the control stick 22 is energized, its light output will not be sensed by the light-sensitive element and hence no signal will be generated for transmission by the sense amplifier 108 to the counter module 104. The absence at the counter module 104 of the signal from the sense amplifier 108 disables the counter, causing it to cease counting with the digital signal present at its output terminals 110 being indicative of the particular light-emitting element 92 from which the light-sensitive element 94 is shaded, and therefore also indicative of the position of the control stick 22 relative to the emitter array 90. As with the circuit of FIG. 4, the counter 104 may be selected to produce an output code in any desired form, with the primary requirement again being that the output signal thus produced be uniquely representative of the particular element 92 from which the element 94 is shaded. Also as before, conventional circuitry (omitted from the figure for clarity) may be employed to periodically restart the counter 104 and thereby provide continuous monitoring of the position of the control stick 22. Further as before, a second light-sensitive element and emitter array may be added, similar to the embodiment of FIG. 1A, to provide a digital representation of the position of the control stick 22 relative to the two planes containing the two arrays.

Figure 7:
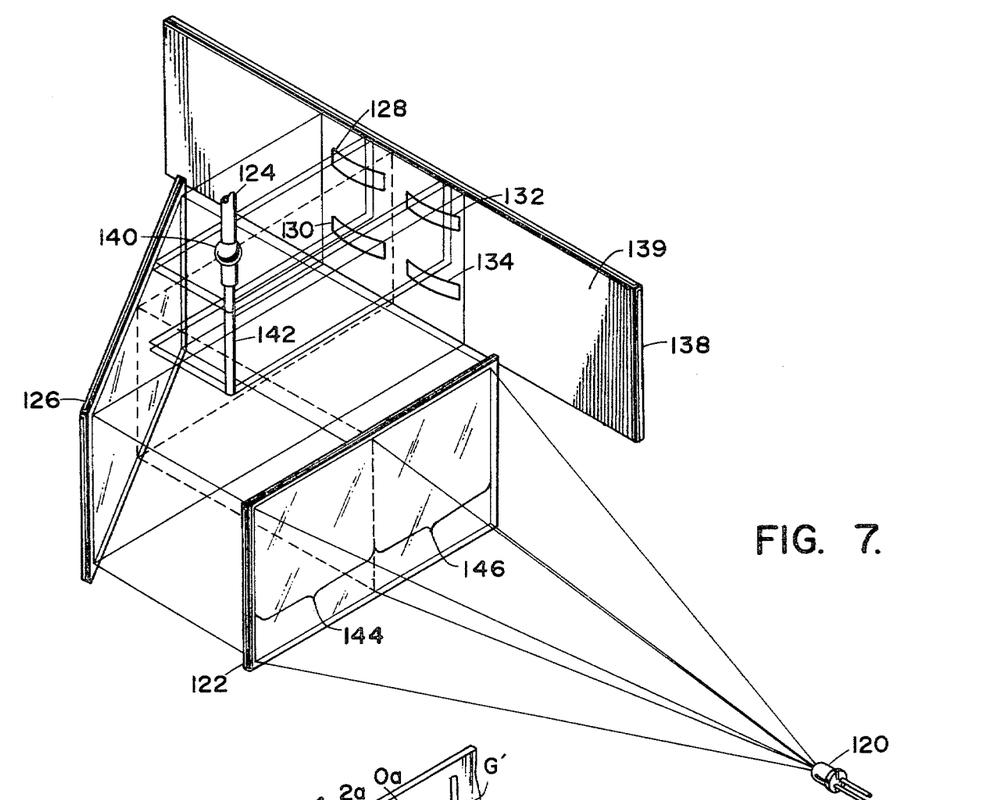
FIG. 7 is a perspective view of a third exemplary embodiment of the optical encoder device of the present invention.
Figure 8:
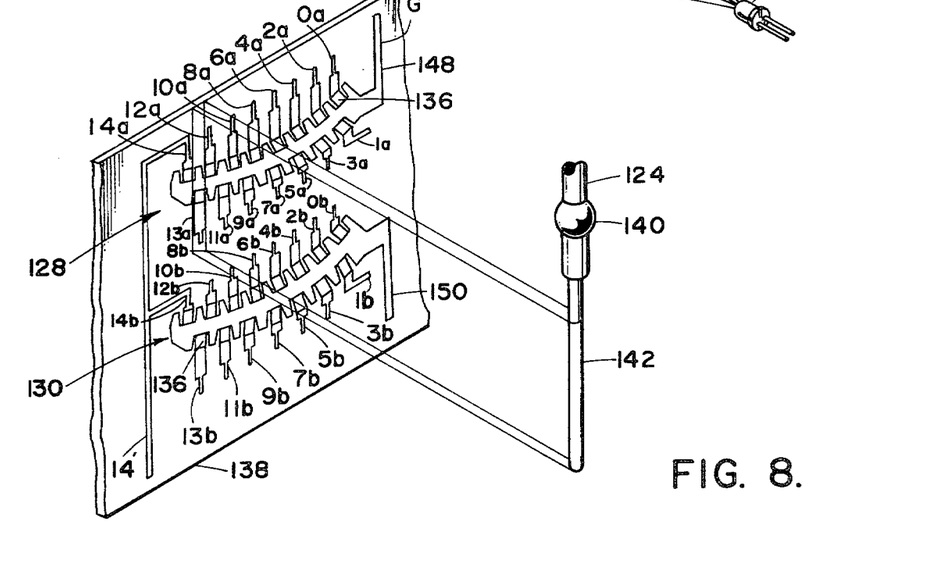
FIG. 8 is a partial view of selected components of the encoder device of FIG. 7.

Referring lastly to FIGS. 7 and 8, there is disclosed a third exemplary embodiment of the optical position encoder of the present invention. This embodiment comprises a single light source 120, a collimating lens element 122, a control stick 124, a planar mirror element 126 and four arrays 128–134 of light-sensitive elements 136 mounted on a single supportive substrate 138. Similar to the earlier-described embodiments, the control stick 124 is mounted on a suitable supporting structure and pivotable about a spherical fulcrum portion 140 such that an elongate portion 142 extends into the path of light waves eminating from the source 120 after those waves have been collimated by the lens element 122. Also included, but omitted from the drawings for clarity, are encoding circuits such as disclosed in FIGS. 3 and 4 for encoding signals generated by the light-sensitive elements 136 of each array 128 and 132 into a digital output signal unique for each element.

The primary difference between the embodiment of the position encoder shown in FIGS. 7 and 8 and the embodiment disclosed and described earlier with reference to FIGS. 1 and 2 is the employment of the mirror element 126 and the additional three arrays 130–134 of light-sensitive elements. The configuration of the light-sensitive arrays 128-134 themselves is also different, being curved to match the arc described by the pivotal motion of the elongate portion 142 of the control stick 124; however, this configuration, preferable because it permits a more accurate detection of the position of the control stick, may be employed with the earlier embodiments as well. The actual construction of the individual elements 136 making up the arrays 130-134 may be by any sujtable means such as the thick film technique described earlier.

As shown in FIG. 7, the substrate 138 on which the light-sensitive elements 136 are mounted is oriented with its face 139 perpendicular to the direction of the light waves collimated by the lens element 122, and the mirror element 126 is oriented at a 45 degree angle to both the light waves and the sub-strate. This orientation causes a first portion 144 of the light eminating from the source 120 to be deflected by the mirror past the elongate portion 142 of the control stick 124 and onto the light-sensitive array pair 132 and 134, while a second portion 146 of the light is caused to pass by the control stick 124 and then be deflected by the mirror element 126 onto a second light-sensitive array pair 128 and 130. Note that the elongate portion 142 of the control stick interrupts only the lightwaves destined for arrays 128 and 132, and not those destined for arrays 130 and 134. In this manner, as will be apparent to those persons familiar with the art, the two light-sensitive arrays 128 and 132 mounted side by side on the single planar substrate 138 receive shadow information from the control stick 124 indicative of its position relative to two mutually perpendicular reference planes, those planes being analogous to the mutually perpendicular planes containing the light-sensitive arrays 30 and 30' described earlier with reference to FIG. 1A, while the two light-sensitive arrays 130 and 134 mounted side by side on the same substrate are illuminated constantly. The use of the mirror element 126 as described permits each of the four arrays 128-134 to be mounted on the single substrate 138 and be formed at the same time under identical conditions, thus assuring a uniformity in their electrical characteristics.

For operation, each array pair 128, 130 and 132, 134 is interconnected as indicated in FIG. 8 and described below. Considering only the two light-sensitive arrays 128 and 130 of FIG. 8, and adopting a terminal labeling convention similar to that of the single array 30 shown in FIG. 2, each conductor in the upper array 128 is connected in series with a corresponding conductor in the lower array 130. For example, as shown in the figure, conductor 14a is connected to conductor 14b to form conductor 14'. The other conductors 0a-13a of array 128 are interconnected with conductors 0b-13b of array 130 in a similar manner to form conductors 0'-13'. The exceptions are the two common conductors 148 and 150 which are left as individual conductors. In use, the interconnected arrays 128 and 130 are connected in an encoding circuit such as that of FIG. 3 as replacements, respectively for the single array 30 and plurality of resistors 44. This replacement is effected by connecting the conductors 0'-14' of the array pair 128, 130 to the circuit points labeled 0-14 in FIG. 3, connecting the common conductor 148 to ground, and connecting the common conductor 150 to a suitable voltage source. The array 30 and resistive elements 44 are, of course, not used in this configuration. In a similar manner, the other array pair 132, 134 is connected in a second encoding circuit and the two circuits employed as described earlier to produce digital signals representative of the position of the control stick 124 with respect to the two arrays 128 and 132.

The formation of both light-sensitive arrays of each array pair on the same substrate, at the same time, and under the same conditions ensures that each resistive element in each array will exhibit substantially identical characteristics, thereby ensuring that during operation of the device the signals produced at the circuit points 0-14 of FIG. 3 (terminals 0'-14' of FIG. 8) with respect to the circuit point G will be uniform. This uniformity minimizes in turn the probability of error signals being generated at the input terminals of the encoder modules 46 and 48 as the light-sensitive elements 136 are alternately shaded and illuminated.

In operation, the control stick 124 is moved as desired causing its elongate portion 142 to simultaneously shade at least one light-sensitive element 136 in each array 128 and 132. At the same time, the associated encoding circuits produce digital signals that are indicative of the particular light-sensitive elements so shaded and therefore also representative of the position of the control stick relative to the two arrays. The remainder of the operation of the embodiment of FIGS. 7 and 8 will be apparent to those persons skilled in the art upon consideration of the comments regarding the earlier-described embodiments.

The terms and expressions which have been employed in the foregoing abstract and specification are used therein as terms of description and not of limitation, and there is no intention, in the use of such terms and expressions, of excluding equivalents of the features shown and described or portions thereof, it being recognized that the scope of the invention is defined and limited only by the claims which follow.

I claim as my invention:

1. A method of producing a digital representation of the relative position of a movable control stick comprising the steps of:
   (a) providing a single source of illumination;
   (b) providing a first and second array of light-sensitive elements out of the direct path of said illumination;
   (c) directing a first portion of illumination from said source to said first array;
   (d) directing a second different portion of said illumination from said source to said second array;
   (e) positioning a single control stick so as to simultaneously shade a first selected element in said first array and a second selected element in said second array from said respective portions of said illumination; and
   (f) generating a digital signal indicative of a particular said element in each said array that is shaded by said stick, said signal being representative of the position of said stick relative to each said array.

2. An optical position encoder comprising:
   (a) a single light-emitting element for producing first and second focused beams of light;
   (b) first and second light-sensitive elements positioned out of the paths of said light beams;
   (c) reflector means for deflecting said first light beam toward said first light-sensitive element and said second light beam toward said second light-sensitive element;
   (d) a control stick selectively positionable so as to shade simultaneously said first light-sensitive element from said first light beam and said second light-sensitive element from said second light beam; and (e) circuit means associated with said light-sensitive elements for producing a signal whenever either of said elements are so shaded.

3. The optical position encoder of claim 1 further comprising a first plurality of light-sensitive elements combined with said first such element to form a first spaced array of said elements and a second plurality of light-sensitive elements combined with said second such element to form a second spaced array of said elements, wherein said reflector means includes means for deflecting said first and second light beams towards said first and second arrays, respectively, and wherein said signal-producing means includes means for producing a unique signal whenever a respective one of said elements is shaded by said control stick.

4. The optical position encoder of claim 1 wherein the paths of said light beams are aligned in a common direction and wherein said reflector means includes a mirror positioned so as to deflect said beams in a second common direction normal to said first direction.

5. The optical position encoder of claim 4 wherein said first light-sensitive element is positioned in the path of said first deflected beam and said second light-sensitive element is positioned in the path of said second deflected beam.

6. The optical position encoder of claim 4 wherein said control stick is positionable simultaneously in the path of said first light beam before deflection and in the path of said second light beam after deflection.

7. The optical position encoder of claim 3 wherein said first and second arrays of said light-sensitive elements are mounted on the same face of a single planar support member.

8. The optical position encoder of claim 3 further comprising third and fourth arrays of light-sensitive elements positioned so as to be constantly illuminated by said first and second light beams, respectively, each of said elements in said third array being connected in series with a different said element in said first array and each of said elements in said fourth array being connected in series with a different said element in said second array.

9. The optical position encoder of claim 3 wherein said first and second pluralities of light-sensitive elements are formed as first and second spaced arrays of said elements on the same face of a single planar support member.

10. The optical position encoder of claim 9 further comprising third and fourth arrays of said light-sensitive elements formed on said face of said planar support member and positioned so as to be constantly illuminated by a respective one of said deflected light beams, each of said elements in said third array being connected in series with a different said element of said first array and each of said elements in said fourth array being connected in series with a different said element of said second array.

* * * * *

UNITED STATES PATENT AND TRADEMARK OFFICE
CERTIFICATE OF CORRECTION

PATENT NO. : 4,250,378
DATED : Feb. 10, 1981
INVENTOR(S) : Jon C. Mutton

It is certified that error appears in the above-identified patent and that said Letters Patent are hereby corrected as shown below:

Col. 4, line 2, change "us" to --use--.

Col. 4, line 45, change "G5" to --GS--.

Col. 4, line 46, change "x" to --X--.

Col. 4, line 46, change last "0" to --1--.

Col. 5, line 34, change "of" to --or--.

Col. 8, line 56, "eminating" to --emanating--.

Col. 9, line 9, change "sujtable" to --suitable--.

Col. 9, line 16, "sub-strate" to --substrate--.

Col. 9, line 17, change "eminating" to --emanating--.

Col. 11, line 7, change "claim 1" to --claim 2--.

Col. 11, line 19, change "claim 1" to --claim 2--.

Signed and Sealed this

Nineteenth Day of May 1981

[SEAL]

Attest:

RENE D. TEGTMEYER

Attesting Officer  Acting Commissioner of Patents and Trademarks